United States Patent
Pakuszewski et al.

(10) Patent No.: US 10,557,349 B2
(45) Date of Patent: Feb. 11, 2020

(54) METHOD AND SYSTEM FOR REPAIRING A TURBOMACHINE

(71) Applicant: General Electric Company, Schenectady, NY (US)

(72) Inventors: Mariusz Pakuszewski, Warsaw (PL); Georg Alois Smieskol, Baden (CH); Marek Wojciechowski, Warsaw (PL)

(73) Assignee: General Electric Company, Schenectady, NY (US)

( * ) Notice: Subject to any disclaimer, the term of this patent is extended or adjusted under 35 U.S.C. 154(b) by 76 days.

(21) Appl. No.: 16/047,754

(22) Filed: Jul. 27, 2018

(65) Prior Publication Data

US 2019/0032489 A1 Jan. 31, 2019

(30) Foreign Application Priority Data

Jul. 27, 2017 (EP) .................................... 17461575

(51) Int. Cl.
*F01D 5/00* (2006.01)
*F01D 5/22* (2006.01)
(Continued)

(52) U.S. Cl.
CPC .............. *F01D 5/005* (2013.01); *B22F 5/009* (2013.01); *B22F 5/04* (2013.01); *B23P 6/002* (2013.01);
(Continued)

(58) Field of Classification Search
CPC .......... F01D 5/005; F01D 5/009; F01D 5/027; F01D 5/20; B22F 5/009; B22F 5/04;
(Continued)

(56) References Cited

U.S. PATENT DOCUMENTS 4,128,929 A 12/1978 Demusis
5,794,338 A 8/1998 Bowden, Jr. et al.
(Continued)

FOREIGN PATENT DOCUMENTS

EP 1172524 A2 1/2002
EP 2655005 A1 10/2013
WO 2012085172 A1 6/2012

OTHER PUBLICATIONS

European Search Report issued in connection with corresponding EP application No. 17461575.7 dated Jan. 26, 2018.

*Primary Examiner* — Igor Kershteyn
(74) *Attorney, Agent, or Firm* — Charlotte C. Wilson; James W. Pemrick

(57) ABSTRACT

A method to repair a turbomachine including: assign blades and a shroud in a row of the turbomachine to a group; measure, for each blade in the group, a clearance between a tip surface of the blade and a surface of the shroud facing the tip surface; remove the blades and shroud from the row; calculate a difference between the clearance of associated each blade and a design clearance; determine, for each blade, if the difference may be minimized by adding material to the surface of the shroud; adding material to the surface of the shroud, wherein the addition of material to the facing surfaces results in the shroud having at least one dimension that exceeds an original design dimension of the shroud sections, and installing the group of the blades and the shroud with the added material to a row of a turbomachine, wherein at least one of the blades has at least one dimension that does not conform to an original design specification for the blade.

15 Claims, 6 Drawing Sheets

(51) Int. Cl.
    *B23P 6/00*     (2006.01)
    *B22F 5/00*     (2006.01)
    *F01D 5/02*     (2006.01)
    *F01D 11/08*    (2006.01)
    *B22F 5/04*     (2006.01)
    *F01D 5/20*     (2006.01)

(52) U.S. Cl.
    CPC .............. *B23P 6/007* (2013.01); *F01D 5/027* (2013.01); *F01D 5/225* (2013.01); *F01D 11/08* (2013.01); *F01D 5/20* (2013.01); *F05D 2230/80* (2013.01); *F05D 2260/80* (2013.01); *F05D 2260/81* (2013.01)

(58) Field of Classification Search
    CPC ...... B23P 6/002; B23P 6/007; F05D 2230/80; F05D 2260/80; F05D 2260/81
    See application file for complete search history.

(56) References Cited

U.S. PATENT DOCUMENTS

| | | | |
|---|---|---|---|
| 6,233,822 | B1 | 5/2001 | Grossklaus, Jr. |
| 6,332,272 | B1 | 12/2001 | Sinnott et al. |
| 6,467,339 | B1* | 10/2002 | Descoteaux ............ B23P 6/002 73/112.01 |
| 6,532,656 | B1 | 3/2003 | Wilkins et al. |
| 6,701,615 | B2* | 3/2004 | Harding .................. B23P 6/002 29/402.07 |
| 6,890,248 | B2* | 5/2005 | Whitmarsh ............ B23Q 3/063 269/296 |
| 6,915,236 | B2* | 7/2005 | Tanner .................... B23P 6/002 29/402.08 |
| 6,926,495 | B2 | 8/2005 | Diakunchak |
| 7,337,058 | B1* | 2/2008 | Mylaraswamy ....... G07C 5/006 701/101 |
| 8,091,228 | B2 | 1/2012 | Hiskes |
| 8,510,926 | B2 | 8/2013 | Hasselberg et al. |
| 9,018,560 | B2* | 4/2015 | Krizansky ............ B23K 11/002 219/117.1 |
| 2005/0091848 | A1 | 5/2005 | Nenov |
| 2008/0237306 | A1 | 10/2008 | Sathian |
| 2010/0050435 | A1 | 3/2010 | Ahmad Zainuddin |
| 2010/0074755 | A1 | 3/2010 | Richter |
| 2011/0250072 | A1 | 10/2011 | Eberlein |
| 2014/0041223 | A1* | 2/2014 | Wojciechowski ...... F01D 5/005 29/889.1 |
| 2014/0053403 | A1 | 2/2014 | Pawlowski et al. |
| 2018/0371922 | A1* | 12/2018 | Sitkiewicz ............. B23P 6/005 |
| 2019/0010821 | A1* | 1/2019 | Mukhopadhyay ...... F01D 11/20 |

* cited by examiner

METHOD AND SYSTEM FOR REPAIRING A TURBOMACHINE

FIELD OF THE INVENTION

The invention relates to the repair of turbomachines and particularly repair of the blades and shrouds in a turbine, such as in a gas turbine or steam turbine.

BACKGROUND OF THE INVENTION

The conventional approach to repairing the blades and shrouds is to add material to the tips of blades and surfaces of the shrouds, and machine the material until the blades and shrouds are returned their original dimensions. This approach requires that material be added to and machined to both the blades and shrouds. This approach has the advantage of that the repaired blades and shrouds are returned to the original dimensions as new blades and shrouds. Because they are returned to their original dimensions, the blades and shrouds may be used as replacement blades and shroud in other turbines of the same model as that from which the blades and shrouds were removed. A disadvantage of this approach is that reworking blades and shrouds is expensive and time consuming.

BRIEF SUMMARY OF INVENTION

A method is disclosed to repair a turbomachine including: assign blades and a shroud in a row of the turbomachine to a group; measure, for each blade in the group, a clearance between a tip surface of the blade and a surface of the shroud facing the tip surface; remove the blades and shroud from the row; calculate a difference between the clearance of associated each blade and a design clearance; determine for each blade, if the difference may be minimized by adding material to the surface of the shroud; adding material to the surface of the shroud, wherein the addition of material to the facing surfaces results in the shroud having at least one dimension that exceeds a design dimension of the shroud sections, and installing the group of the blades and the shroud with the added material to a row of a turbine, wherein at least one of the blades has at least one dimension that does not conform to a design specification for the blade.

A method is disclosed herein to repair a turbine including: assign turbine blades and shroud segments in a row of the turbine to a group; measure, for each blade in the group, a clearance between a radially outer surface of the blade and the shroud segments in the group; remove the blades and shroud segments from the row; calculate a difference between the clearance of associated each blade and a design clearance; determine, for each blade, if the difference may be minimized by adding material to radially inner surfaces of the shroud segments; adding material to the inner surfaces of the shroud segments, wherein the addition of material to the inner surfaces results in the shroud segments having at least one dimension that exceeds a design dimension of the shroud sections, and installing the group of the blades and the shroud segments with the added material to a row of a turbine, wherein at least one of the blades has at least one dimension that does not conform to a design specification for the blade.

A method to repair a turbomachine comprising: grouping blades and a shroud in a row of the turbomachine together in a group; measuring each blade and determine if the blade is within a design dimension; if the blade is not within the design dimension, determine if adding material to a surface of the shroud will cause a clearance between the blade and the shroud to conform to a design clearance; if the determination is that adding matter will cause the clearance to conform to the design clearance, add material to the surface of the shroud, wherein the addition of the material to the surface results in the shroud having at least one dimension that exceeds a design dimension of the shroud, and installing the group of the blades and the shroud with the added material to a row of the turbomachine.

DETAILED DESCRIPTION OF THE INVENTION

Figure 1:
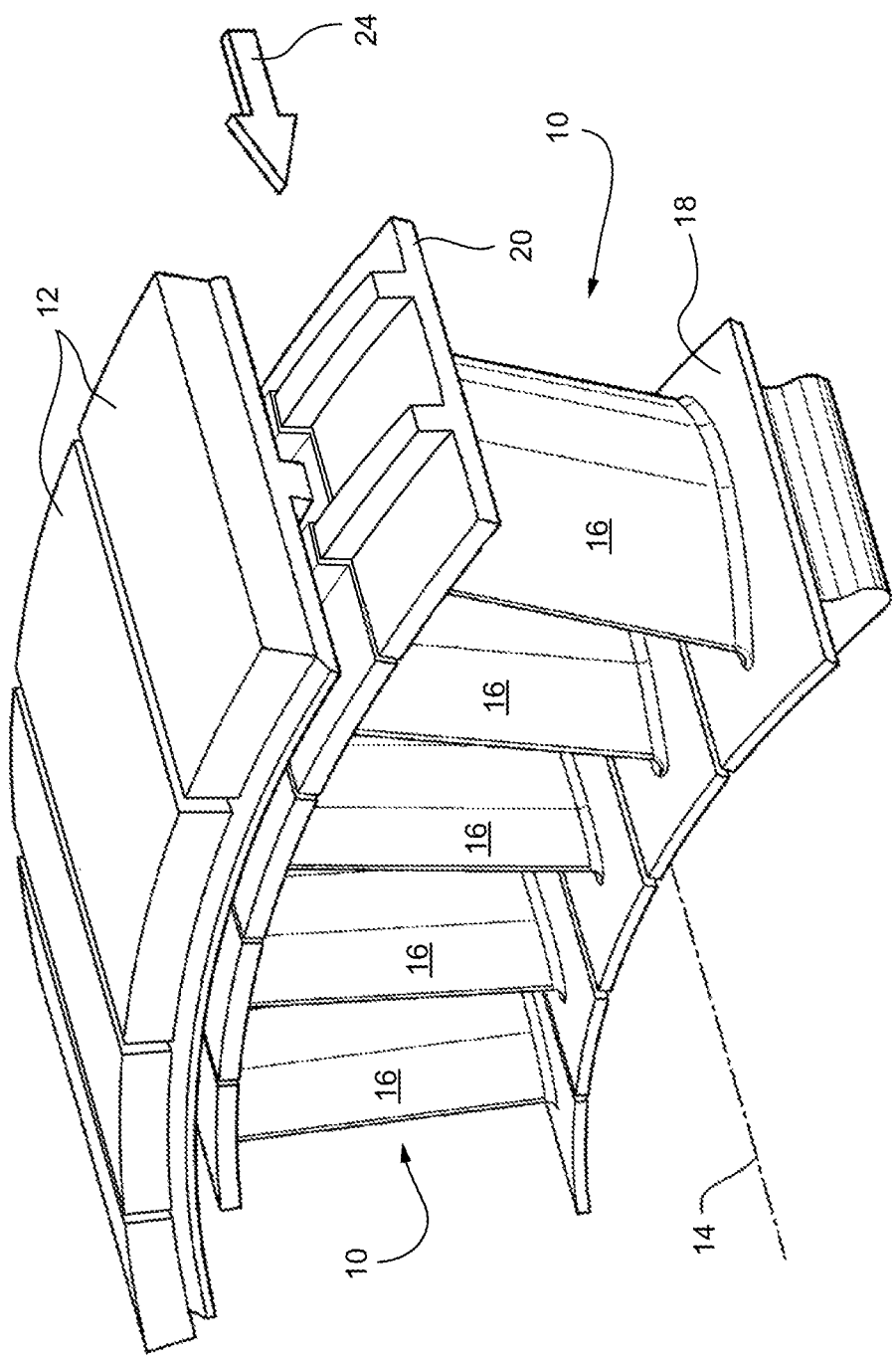
FIG. 1 is a schematic diagram a portion of a conventional row of turbine blades and shroud for a conventional industrial gas turbine.

FIG. 1 shows turbine blades 10 arranged in an annular row and shroud segments 12 arranged in an annular row and surrounding the row of blades. The turbine blades and shroud segments are in a turbine section of an industrial gas turbine having a rotational axis 14.

The gas turbine may have several rows of blades embodied as alternating rows of stationary nozzles and rotating buckets. FIG. 1 shows a row of rotating buckets surrounded by an annular shroud embodied as an annular array of shroud segments 12. A row of stationary nozzles (also referred to as vanes) will be adjacent the row of buckets in the direction of combustion gas flow 24. The nozzles extend radially inwardly from a casing and towards a shroud (or segments of shrouds) mounted to a rotating wheel of the turbine. The tips of the nozzles face a surface of the shroud in a similar manner as the tips of the buckets face a surface of the shroud surrounding the bucket.

For purposes of the description of the invention, the term blades includes the nozzles and/or vanes in a turbomachine, such as the turbine or compressor in a gas turbine engine, in a steam turbine or other bladed axial flow device with a shroud. The term shroud includes an annular shroud or an array of shroud segments adjacent the tips of a row of buckets and/or adjacent the tips of a row of nozzles. A shroud is a component which faces the tips of the blades and restricts the gas flow path to pass through the blades. For shroud and bucket arrangements, the shroud does not rotate and the buckets (also called blades) do rotate. For shroud and nozzle arrangements, the shroud rotates and the nozzles (also called blades) are stationary.

Hot pressurized combustion gases 24 from a combustion section of the gas turbine flow over the airfoil portion 16 of the blades through the rows of blades. The combustion gases 24 rotate and force the rotation of the rows of blades (buckets) and the turbine wheels and shaft to which the blades are mounted.

The hot gases 14 are confined to the airfoil portions 16 of the blades by platforms 18, 20 at the radially inward and outer regions of the blades and by the shrouds segments 12 surrounding the blades. The tips of turbine blades may either be at the radially outer surfaces of the platforms 20 on the tips. Or, if there are no platforms on the blades (as shown in FIG. 2) the tips are the radially outer ends of the airfoil portion of the blades.

Figure 2:
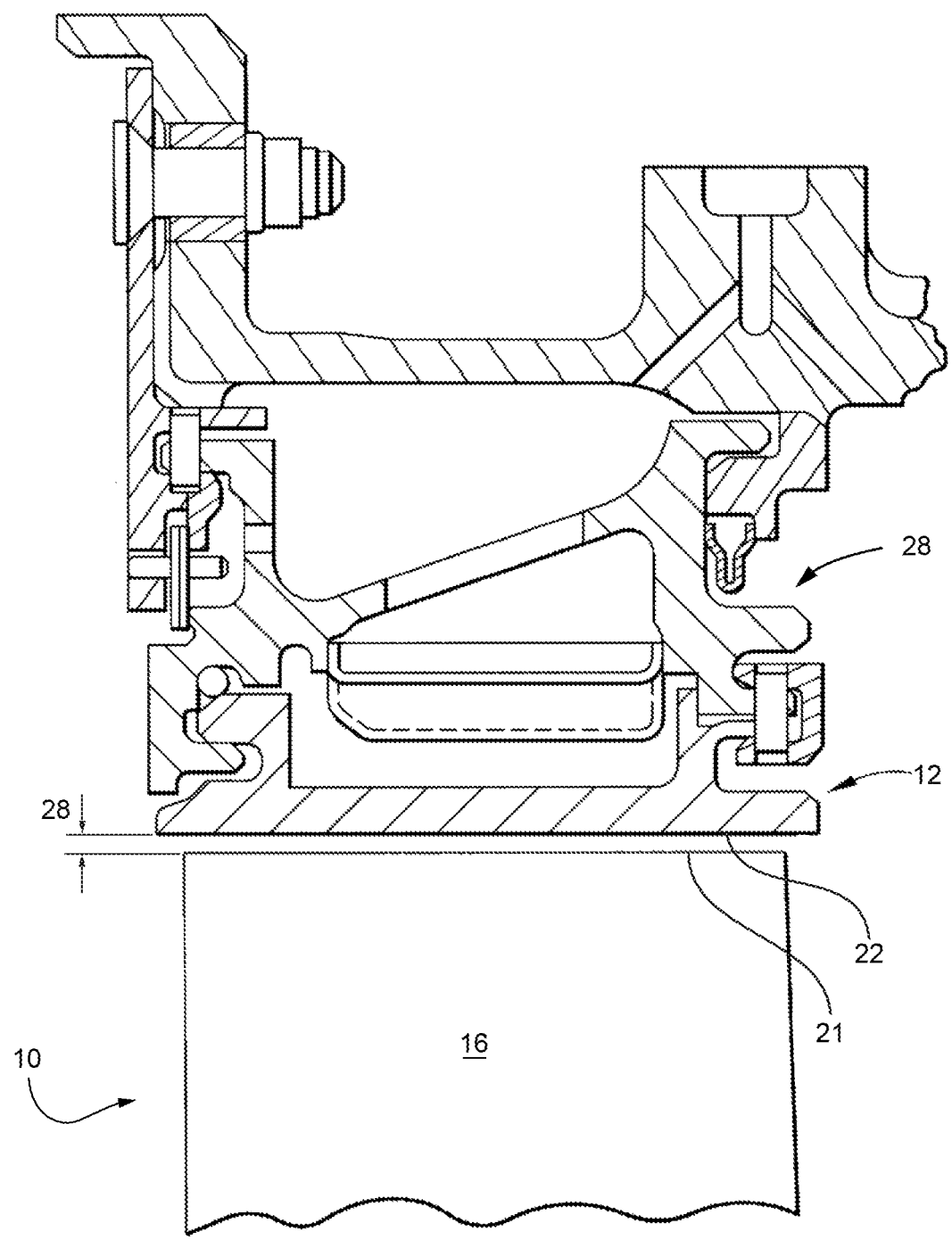
FIG. 2 is a side view of a turbine blade and a side view of a cross section of a shroud and a stator casing surrounding the turbine blade and its associated row of blades.

FIG. 2 shows a side view of a blade 10 and, in cross section, the surrounding annular shroud sections 12 and a stator casing 28. The blade 10 shown in FIG. 2 does not have a radially outer platform as do the blades shown in FIG. 2.

The tips 21 of the blades (FIG. 2) or outer surfaces of the platforms 18 on the blades (FIG. 1) and the inner surfaces 22 of the shroud segments 12 define a gap 28. The gap 28 is the clearance between the tips (radially outer most region) of the blades and the annular shroud facing the tips.

Leakage of hot combustion gases through the gap 28 will degrade the performance of the turbines. Maintaining a small clearance is helpful in reducing leakage of hot combustion gases through the gap between the blades and the shroud. Leakage of hot combustion gases reduces the amount of gases applied to turn the rows of turbine blades (buckets) and thus reduces the efficiency of the turbine. Thus, clearance between the blade tips and shrouds tends to be an important design dimension with respect to the efficiency of the gas turbine. To minimize leakage, the design clearance (gap 28) is intentionally small. The clearance is typically small, such as one to three percent of blade height.

The hot combustion gases tend to erode the tips of the blades and the facing surfaces of the shrouds. Due to the erosion, the clearance increases and thus the performance of the turbine is reduced.

Periodically, the turbine is shut down, a portion of the stator casing 28 is removed and the shroud sections 12 and blades 10 removed from the turbine casing 28. The removed shrouds and blades are inspected, measured and reworked. Reworking may include adding material, e.g., metal, to the tips of the blades and machining the added material and tips of the blades. Reworking may also include adding layers to the inner surface of the shrouds, spraying or sputtering material or otherwise increasing the thickness of inner surface region of the shroud. Reworking the blade tips and/or the shrouds is conventionally intended to return the blades and shroud sections to their original design dimensions and thereby return the clearance to its original design dimension. The original design dimensions are the dimensions for newly built blades and/or shrouds.

Figure 3:
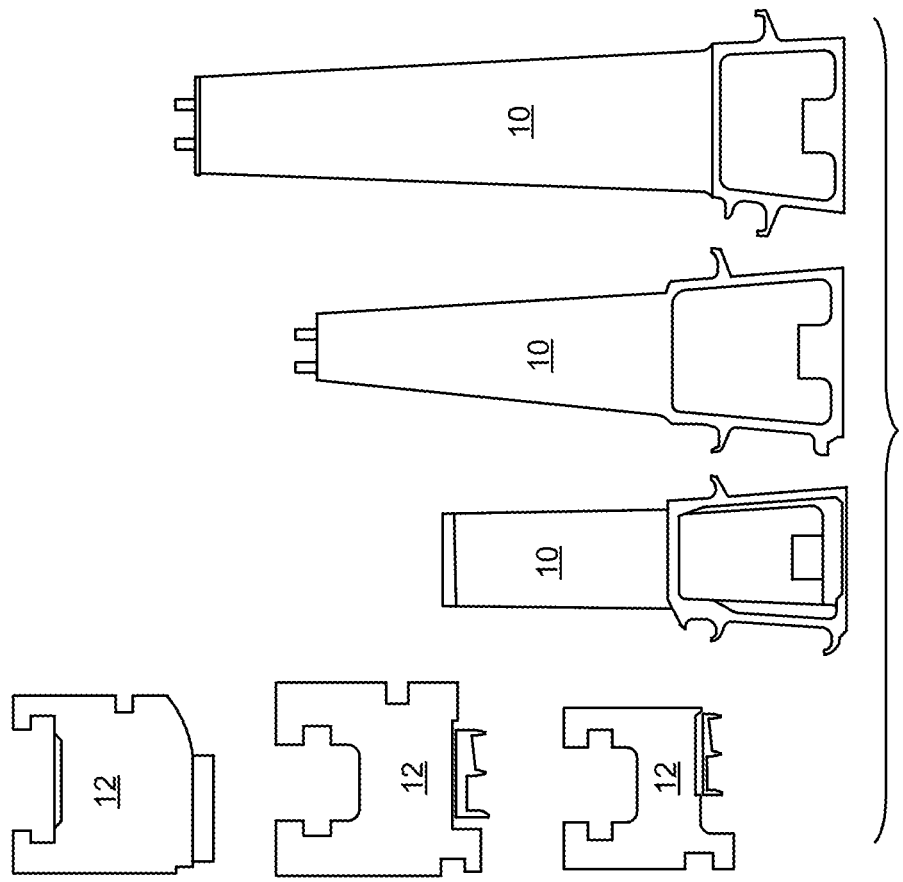
FIG. 3 is a side view of turbine blades and shrouds removed from each of three stages of a turbine section of a gas turbine.

FIG. 3 shows shroud sections 12 and turbine blades 10 removed from the gas turbine and separated in a conventional approach to reworking the blades and shroud sections. In the conventional approach, the turbine blades 10 are reworked to their original design dimensions. Similarly, the shroud sections 12 are reworked to their original design dimensions. The reworked turbine blades and shroud sections are ready for use in a gas turbine of the model for which they were designed. Because the blades and shroud sections have been returned to their original design dimensions there is no need that the reworked blades and shrouds be used again together in the same turbine.

Figure 4:
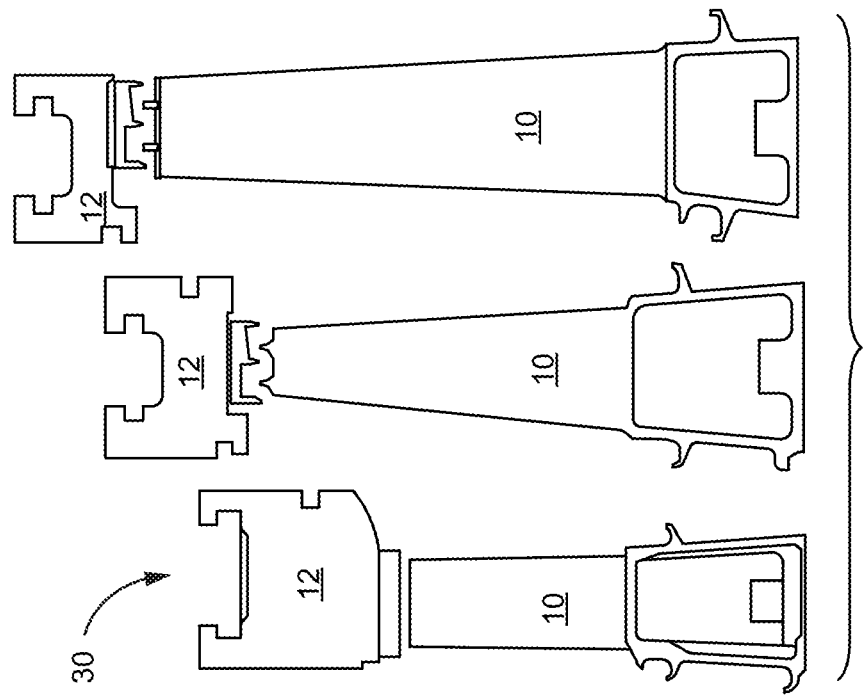
FIG. 4 is a side view of turbine blades and shrouds removed from each of three stages of a turbine section such that the blades and shrouds remain grouped together.

FIG. 4 shows shroud sections 12 and turbine blades 10 grouped 30 together after being removed from the gas turbine. The shroud sections and turbine blades from a row in the turbine section remain grouped together while they are removed from the turbine section and reworked. The grouping may mean that the blades and shroud sections are physically grouped together as they are reworked and returned to the turbine section. Alternatively, the grouping may mean that the blades and shroud sections are assigned to a particular row of a specific turbine section and are all returned to that row for reinstallation into the turbine section. The shroud sections and turbine blades assigned to a particular row may be reworked independently and separately of each other, and only grouped back together for installation into the row of the turbine section.

Figure 5:
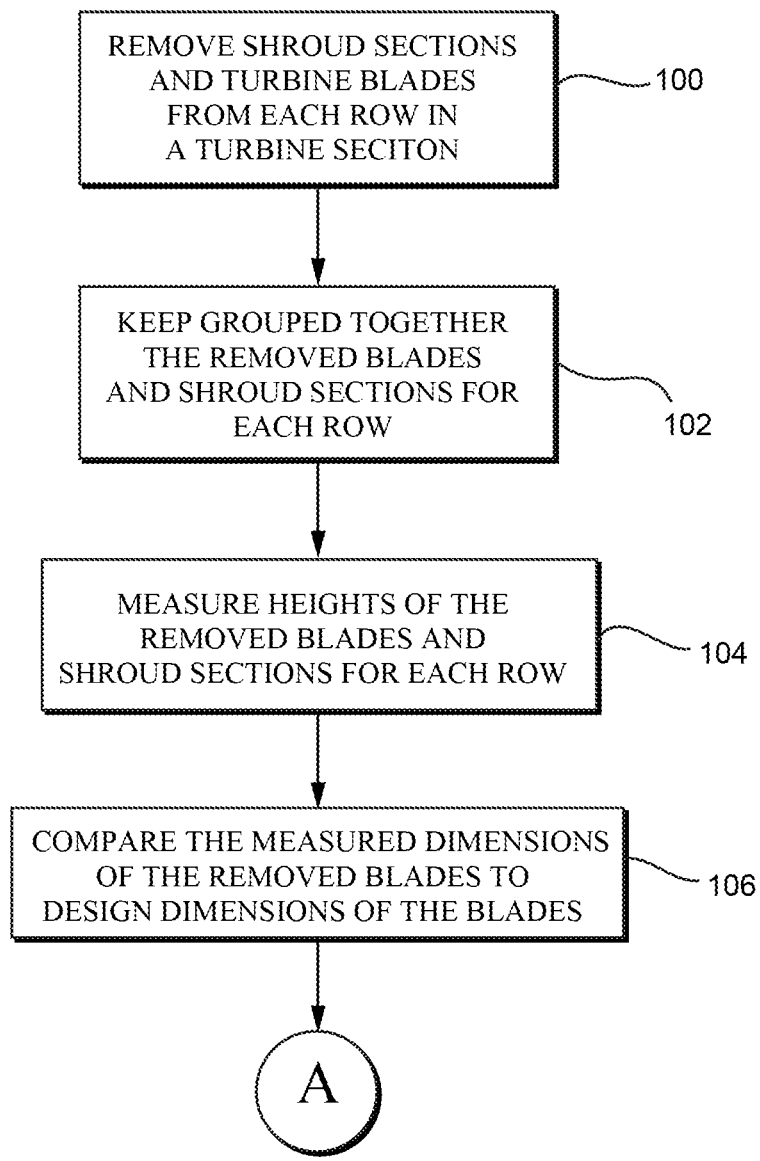
FIGS. 5 to 7 show a flow chart of a method to remove, repair and reinstall turbine blades and shrouds on a turbine section.
Figure 6:
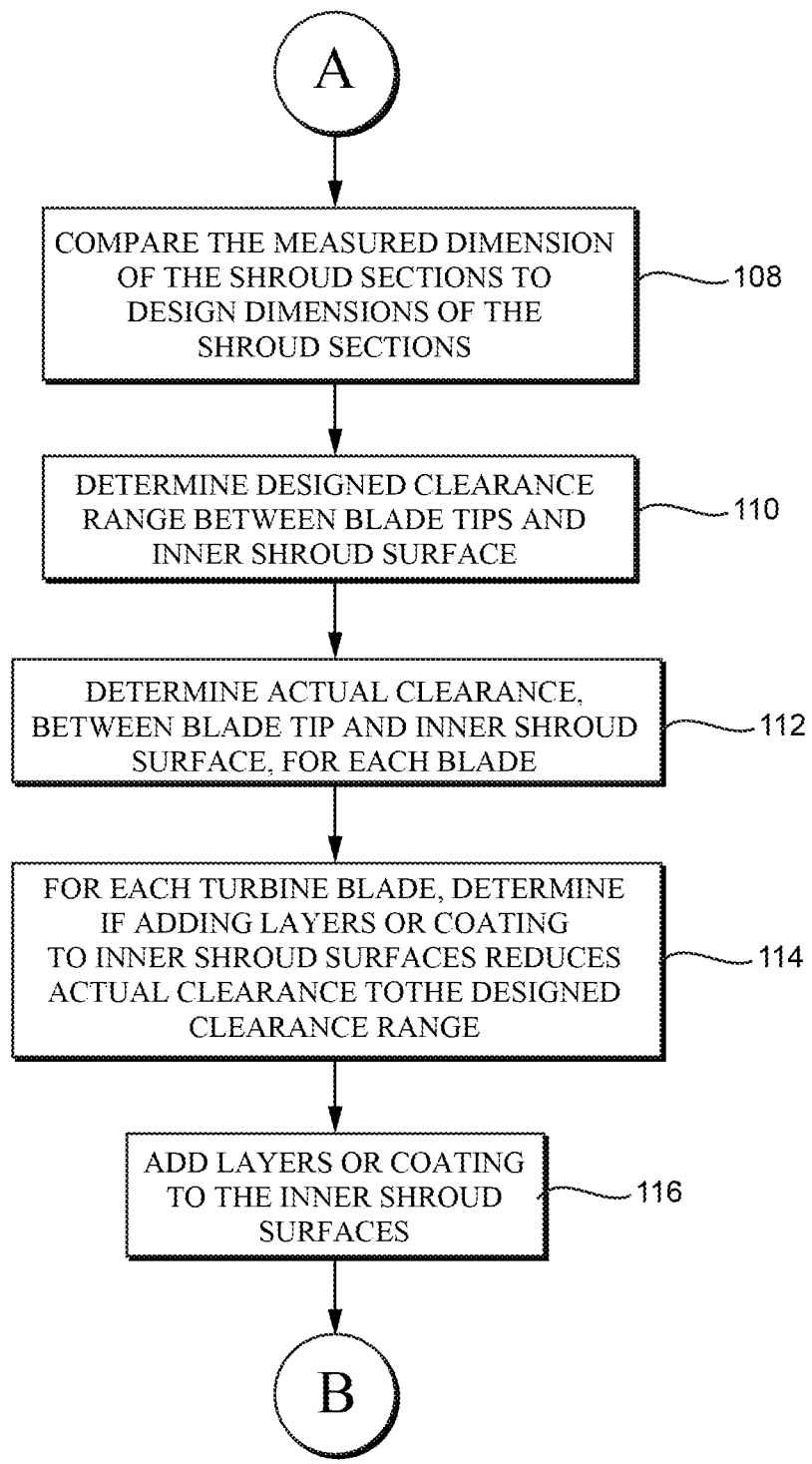
Figure 7:
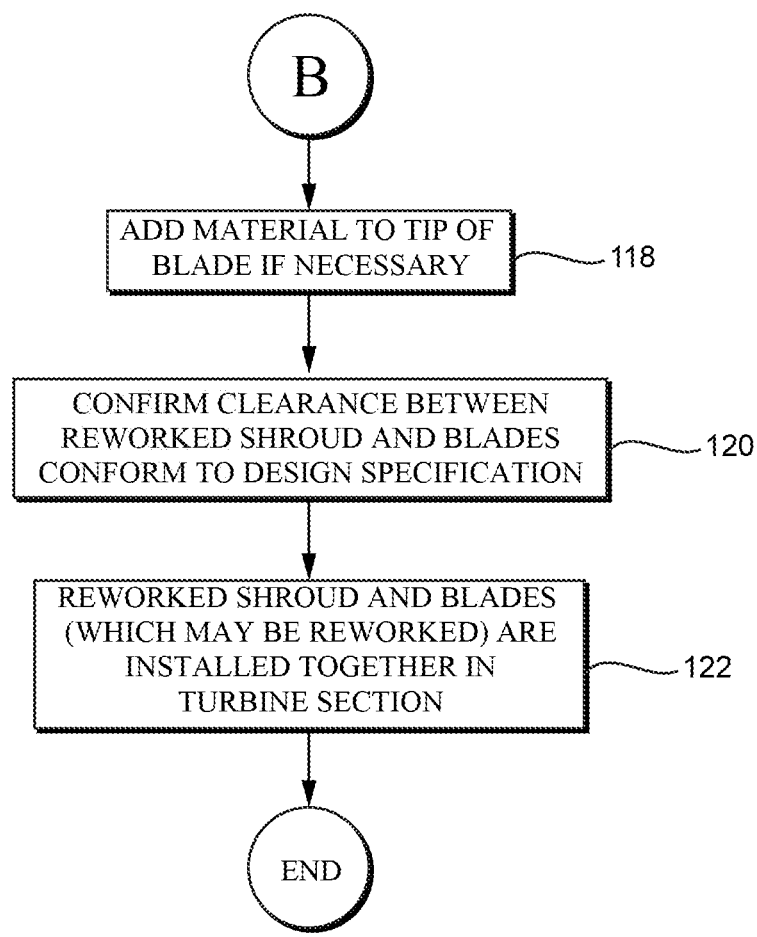

FIGS. 5 to 7 is a process flow chart for the removal, repair and replacement of turbine blades and shroud sections. In step 100, the turbine is shut down and the stator casing and other components removed. The shroud sections and blades are removed from each row in the turbine. In step 102, the removed blades and shroud sections for each row are assigned to a group and may be kept together during the reworking process. By assigning the shroud sections and blades to a group, they may be returned as a group to the same turbine section or another turbine section of a same model turbine, and installed in the same row of the turbine section.

In step 104, the blades and shroud sections are measured and inspected. Measurements are made of the heights of the removed blades and of the inner surface layers and surface conditions of the shroud sections. The height of a blade may be a distance to the radial tip (surface) of the blade from a reference, such as the platform 18. In step 106, the measurements of each blade are compared to the original design dimensions for the blade. Similarly, the measurements of each shroud segment are compared to the original design dimensions for the shroud segment in step 108.

If the height of a blade is within the design tolerances of the design dimension, material need not be added to the tip of the blade and no action is needed to add material to the inner surface of the shroud sections to reduce the clearance between the blade tip and shroud sections.

In step 110, the design clearance is determined such as by looking up the clearance from a design guidebook or retrieving the design clearance from a storage device.

In step 112, a determination is made of the actual clearance between the tip of each blade and the inner surfaces of the array of shrouds for the turbine row corresponding to the blade. This measurement of step 108 may be made before the blades and shroud segments are removed from the turbine. For each blade, a determination is made as to whether the actual clearance is within a range of acceptable clearances between blade tips and shroud surfaces for the row corresponding to the blade. If the actual clearance is greater than the acceptable clearance, the difference between the actual clearance and the acceptable clearance is calculated. This difference is calculated for each of the blades in the row.

In step 114, a determination is made if the calculated differences for each of the blades can be made up by adding layers or coating material to the shroud surfaces facing the tip of the blade. This determination may check whether adding layers or coating materials to the shroud surfaces will allow for sufficient clearance between the tips of all blades in the row and the shroud sections.

If the difference between the blade tip and shroud sections for some or all of the blades can be made up by adding layers or coating material to the shroud sections (without adding material to the blade tip), layers or coating materials, such as by spraying or sputtering material, are added to the shroud surfaces in step 116. Adding layers or coating material to the surfaces of the shrouds tends to be easier, faster and less expensive than adding material to the tip of a blade.

If the added layers or coating material to the shroud sections would reduce the clearance between one or more of the blade tips to an unacceptably narrow clearance, the shortest blade(s) will need to have material added to its tip(s) in step 116. The added material to the tip(s) of the blades, in step 118, will reduce the clearance between those blades and the shroud sections.

In step 120, a confirmation is made that the clearance between each the blades and the shroud sections is within a design specification for the clearance. This confirmation is made after layers or coating material is added to the shroud sections and after material is added to one or more of the blade tips (if material need be added to any of the blade tips).

It may be that the dimensions of the shroud sections with the added layers or coating material are no longer within original design specifications, especially with respect to the specifications of the thickness of the region of the sections adjacent the inner surfaces. Because the shroud sections may be outside of their original design specifications, the shroud sections should only be grouped together with the same row of blades and not used with other blades. Similarly, the blades in the row may no longer be within their original design specifications. The blades should be grouped with the same shroud sections of the row and not used with other shroud sections.

In step 122, the shroud sections and blades are reinstalled to the same row in the turbine from which they were earlier remove. The blades and shroud sections are for use only in that particular row because one or more of the blades and shroud sections may no longer have dimensions that conform to the original design specifications. The variances in the dimension of the shroud section and turbine is provided that the shroud sections are used with the same blades assigned (grouped) to the row from which the shroud sections were removed.

The above described method ensures that the clearance is within an original design specification. The method allows the blades and shroud sections to be non-compliant with other original design dimensional specifications for the blades and shroud sections, such as blade height and shroud thickness adjacent the inner surface. This method has an advantage of providing good turbine efficiency by keeping the clearance within design specifications and reducing the cost of repairing and reworking blades and shroud sections by reducing the need to add material to blade tips.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims. For example, the invention may be applied to various types of turbines and other turbomachines such as axial steam turbines and axial compressors.

What is claimed is:

1. A method to repair a turbomachine comprising:
   assigning blades and a shroud in a row of the turbomachine to a group;
   measuring, for each blade in the group, a clearance between a tip surface of the blade and a surface of the shroud facing the tip surface;
   removing the blades and/or shroud from the row;
   calculating a difference between the clearance of associated each blade and a design clearance;
   determining, for each blade, if the difference may be minimized by adding material to the surface of the shroud;
   adding material to the surface of the shroud, wherein the addition of material to the facing surfaces results in the shroud having at least one dimension that exceeds an original design dimension of the shroud sections, and
   installing the group of the blades and/or the shroud with the added material to a row of a turbomachine, wherein at least one of the blades has at least one dimension that does not conform to an original design specification for the blade.

2. The method of claim 1 wherein installing installs the group of blades and/or shroud to the row of the turbomachine from which the blades and/or shroud were removed.

3. The method of claim 1 wherein material is not added to the tip surfaces of the blades in the group.

4. The method of claim 1 further comprising measuring, for each blade in the row, a dimension of the blade associated with the position of the tip surface of the blade relative to the shroud;
   comparing the dimension of the blade to an original design dimension of the blade;
   if the dimension of the blade does not conform to the original design dimension, determining if the addition of the addition of the added material to the surface of the shroud causes the clearance for the blade to conform to the design clearance, and
   if the determination is that the clearance for the blade does not conform to the design clearance, adding material to the tip of the blade.

5. The method of claim 1 wherein the adding of material to the surfaces of the shroud includes at least one of adding layers of material, supporting material and spraying material.

6. The method of claim 1 wherein the turbomachine is a gas turbine, the blades are arranged in a row of buckets for a rotating portion of a turbine of the gas turbine and the shroud is an array of shroud segments surrounding the row of buckets.

7. A method to repair a turbomachine comprising:
   grouping blades and a shroud in a row of the turbomachine together in a group;
   measuring each blade to determine if the blade is within an original design dimension;
   if the blade is not within the original design dimension, determining if adding material to a surface of the shroud will cause a clearance between the blade and the shroud to conform to a design clearance;
   if the determination is that adding matter will cause the clearance to conform to the design clearance, adding material to the surface of the shroud, wherein the addition of the material to the surface results in the shroud having at least one dimension that exceeds an original design dimension of the shroud, and
   installing the group of the blades and the shroud with the added material to a row of the turbomachine.

8. The method of claim 7 wherein at least one of the blades has at least one dimension that does not conform to an original design specification for the blade.

9. The method of claim 7 wherein installing installs the group of blades and shroud to the row of the turbomachine from which the blades and shroud were removed.

10. The method of claim 7 wherein material is not added to tips of the blades in the group.

11. The method of claim 7 wherein if the determination is that the clearance for the blade does not conform to the design clearance, adding material to a tip of the blade.

12. The method of claim 7 wherein the adding of material to the surface of the shroud segment includes at least one of adding layers of material, supporting material and spraying material.

13. The method of claim 7 wherein the turbomachine is a gas turbine, the blades are arranged in a row of buckets for a rotating portion of a turbine of the turbomachine and the shroud is an array of shroud segments surrounding the row of buckets.

14. A turbine comprising:
   an annular row of turbine blades;
   an annular shroud aligned with the row of turbine blades and forming a row of the blades and the shroud in the turbine;
   a clearance between the row of turbine blades and the shroud, wherein the clearance is within a design specification for the clearance;
   at least one of the turbine blades has a dimension at a tip of the blade which is shorter than an original design dimension for the tip of the blade, and
   the shroud has a dimension of a surface region facing the blades which is thicker than an original design dimension of the surface.

15. The turbine of claim 14 wherein the turbine blades and the shroud segments were previously removed as a group from a row in a gas turbine.

* * * * *